United States Patent
Shimoike

(10) Patent No.: US 12,228,907 B2
(45) Date of Patent: Feb. 18, 2025

(54) CHIP PROCESSING DEVICE FOR MACHINE TOOL AND CHIP PROCESSING METHOD

(71) Applicant: DMG MORI CO., LTD., Nara (JP)

(72) Inventor: Masahiro Shimoike, Nara (JP)

(73) Assignee: DMG MORI CO., LTD., Nara (JP)

( * ) Notice: Subject to any disclaimer, the term of this patent is extended or adjusted under 35 U.S.C. 154(b) by 594 days.

(21) Appl. No.: 17/439,347

(22) PCT Filed: Mar. 13, 2020

(86) PCT No.: PCT/JP2020/011068
§ 371 (c)(1),
(2) Date: Sep. 14, 2021

(87) PCT Pub. No.: WO2020/189547
PCT Pub. Date: Sep. 24, 2020

(65) Prior Publication Data
US 2022/0179390 A1    Jun. 9, 2022

(30) Foreign Application Priority Data

Mar. 15, 2019   (JP) ................. 2019-047865

(51) Int. Cl.
*G05B 19/402* (2006.01)
*B23Q 11/00* (2006.01)
(Continued)

(52) U.S. Cl.
CPC ........ *G05B 19/402* (2013.01); *B23Q 11/0067* (2013.01); *G05B 19/182* (2013.01);
(Continued)

(58) Field of Classification Search
CPC ............... G05B 19/402; G05B 19/182; G05B 19/40938; G05B 2219/49042; G06N 20/00; B23Q 11/0067
(Continued)

(56) References Cited

U.S. PATENT DOCUMENTS 10,279,448 B2 * 5/2019 Nakayama ......... B23Q 11/0075
10,376,821 B2 * 8/2019 Pluvinage ............ B01D 33/461
(Continued)

FOREIGN PATENT DOCUMENTS

CN   108154098 A   6/2018
CN   108500736 A   9/2018
(Continued)

OTHER PUBLICATIONS

International Search Report, PCT/JP2020/011068, dated Jun. 2, 2020, 12 pages.
(Continued)

*Primary Examiner* — Md Azad
(74) *Attorney, Agent, or Firm* — Stinson LLP

(57) ABSTRACT

Disclosed is a chip processing device for a machine tool, including a cleaning nozzle control unit 30 that controls a cleaning nozzle for spraying a cleaning fluid onto chips scattered during machining so as to guide the chips to a chip collection portion, wherein the cleaning nozzle control unit 30 includes: a position estimation unit 31 that estimates an accumulation position of generated chips by analyzing machining conditions of a workpiece; and a nozzle orientation adjustment unit 34 that adjusts an orientation of the cleaning nozzle toward the accumulation position estimated by the position estimation unit 31.

9 Claims, 7 Drawing Sheets

(51) Int. Cl.
  *G05B 19/18* (2006.01)
  *G05B 19/4093* (2006.01)
  *G06N 20/00* (2019.01)
(52) U.S. Cl.
  CPC ....... *G05B 19/40938* (2013.01); *G06N 20/00* (2019.01); *G05B 2219/49042* (2013.01)
(58) Field of Classification Search
  USPC ....................................................... 700/192
  See application file for complete search history.

(56) References Cited

U.S. PATENT DOCUMENTS

| | | |
|---|---|---|
| 2008/0219781 A1 | 9/2008 | Hyatt et al. |
| 2010/0293739 A1 | 11/2010 | Imamura et al. |
| 2016/0263745 A1 | 9/2016 | Shirahata |
| 2016/0311076 A1 | 10/2016 | Matsumoto et al. |
| 2017/0144262 A1* | 5/2017 | Okuda ................ B05B 13/0431 |
| 2017/0316323 A1 | 11/2017 | Nakanishi et al. |
| 2018/0246494 A1 | 8/2018 | Nakahama |
| 2018/0267489 A1 | 9/2018 | Tango et al. |
| 2019/0039198 A1 | 2/2019 | Sugiura |
| 2019/0196446 A1* | 6/2019 | Tanabe ................. G05B 19/402 |
| 2020/0301390 A1* | 9/2020 | Albertelli ............. G05B 19/414 |

FOREIGN PATENT DOCUMENTS

| | | |
|---|---|---|
| CN | 109002012 A | 12/2018 |
| JP | 2002-096237 A | 4/2002 |
| JP | 2002-263985 A | 9/2002 |
| JP | 2002-283180 A | 10/2002 |
| JP | 2015-024454 A | 2/2015 |

OTHER PUBLICATIONS

European Search Report issued in the corresponding European Patent Application No. 20774152.1, mailed Nov. 15, 2022.

* cited by examiner (a)

(b)

CHIP PROCESSING DEVICE FOR MACHINE TOOL AND CHIP PROCESSING METHOD

REFERENCE TO RELATED APPLICATIONS

This application is a 371 U.S. national stage application of International Patent Application No. PCT/JP2020/011068, filed Mar. 13, 2020, which claims the benefit of Japanese Patent Application No. 2019-047865, filed Mar. 15, 2019, the entire disclosures of which are incorporated herein by reference.

TECHNICAL FIELD

The present invention relates to a chip processing device for a machine tool, including a cleaning nozzle control unit that controls a cleaning nozzle for spraying a cleaning fluid onto chips scattered during machining so as to guide the chips to a chip collection portion, and a chip processing method for a machine tool.

BACKGROUND ART

PTL 1 discloses a machine tool that includes a nozzle for supplying a coolant to a portion of a workpiece that is to be machined using a tool, and the machine tool cools the workpiece and the tool, and removes chips generated by machining.

Also, PTL 2 discloses a chip processing device by which chips are collected, together with a coolant, in a coolant tank installed below a portion to be machined, and the collected chips are transported to the outside of a machine tool by a chip conveyor disposed below the coolant tank.

CITATION LIST

Patent Literatures

[PTL 1] Japanese Laid-Open Patent Publication (Translation of PCT Application) No. 2010-520071
[PTL 2] Japanese Laid-Open Patent Publication No. 2002-096237

SUMMARY OF INVENTION

Technical Problem

A machine tool as disclosed in PTL 1 is provided with a coolant ejection mechanism including a nozzle that is pivotable relative to a tool holder attachment portion of a tool post, and the nozzle is appropriately pivoted toward an accumulation location of chips in the machine tool so as to eject the coolant, whereby chips scattered on a pallet or a table can be cleaned.

However, this is a time-consuming, inefficient operation because an operator who has visually confirmed the accumulation state of the chips scattered on the pallet or the table needs to adjust the orientation of the nozzle by operating a control board.

In view of the above-described problem, an object of the present invention is to provide a chip processing device and a chip processing method for a machine tool that enable the orientation of a nozzle to be automatically adjusted such that a cleaning fluid is ejected toward an area where chips are accumulated.

Solution to Problem

In order to attain this object, a chip processing device for a machine tool according to the present invention is a chip processing device for a machine tool, including a cleaning nozzle control unit that controls a cleaning nozzle for spraying a cleaning fluid onto chips scattered during machining so as to guide the chips to a chip collection portion, wherein the cleaning nozzle control unit includes: a position estimation unit that estimates an accumulation position of generated chips by analyzing machining conditions of a workpiece; and a nozzle orientation adjustment unit that adjusts an orientation of the cleaning nozzle toward the accumulation position estimated by the position estimation unit.

A chip processing method for a machine tool according to the present invention is a chip processing method for a machine tool, including a cleaning nozzle control step of controlling a cleaning nozzle for spraying a cleaning fluid onto chips scattered during machining so as to guide the chips to a chip collection portion, wherein the cleaning nozzle control step includes: a position estimation step of estimating an accumulation position of generated chips by analyzing machining conditions of a workpiece, and a nozzle orientation adjustment step of adjusting an orientation of the cleaning nozzle toward the accumulation position estimated in the position estimation step.

Advantageous Effects of Invention

The present invention makes it possible to provide a chip processing device and a chip processing method for a machine tool that enable the orientation of a nozzle to be automatically adjusted such that a cleaning fluid is ejected toward an area where chips are accumulated.

While the novel features of the invention are set forth in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 1(a) is an explanatory diagram showing a basic configuration of the machine tool as viewed from the side, and FIG. 1(b) is an explanatory diagram showing the basic configuration of the machine tool as viewed from the front.

DESCRIPTION OF EMBODIMENTS

Figure 1:
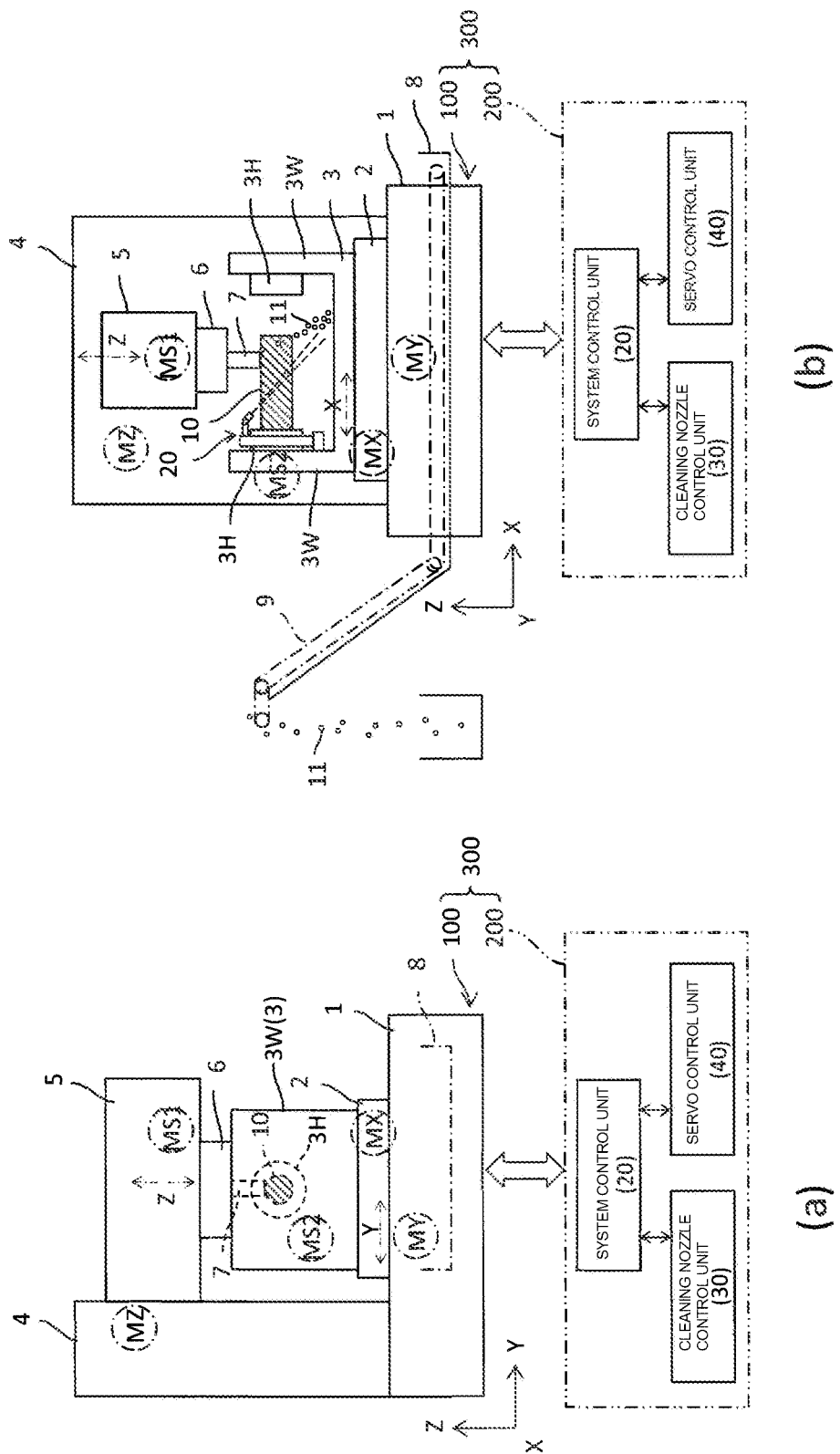
FIG. 1 shows explanatory diagrams of a machine tool in which a chip processing device is incorporated, where

[Basic Embodiment of Chip Processing Device for Machine Tool]

A chip processing device for a machine tool according to the present invention is a chip processing device for a machine tool, including a cleaning nozzle control unit that controls a cleaning nozzle for spraying a cleaning fluid onto chips scattered during machining so as to guide the chips to a chip collection portion, wherein the cleaning nozzle control unit includes: a position estimation unit that estimates an accumulation position of generated chips by analyzing machining conditions of a workpiece; and a nozzle orientation adjustment unit that adjusts an orientation of the cleaning nozzle toward the accumulation position estimated by the position estimation unit.

That is, the position estimation unit analyzes the machining conditions of the workpiece, and estimates the accumulation position of chips generated by machining, and the nozzle orientation adjustment unit adjusts the orientation of the cleaning nozzle such that the cleaning fluid is sprayed to the accumulation position of the chips.

As an aspect, it is preferable that the position estimation unit includes: an FEM (Finite Element Method) analysis unit that performs an FEM analysis based on a machining parameter included in an NC (Numerical Control) program used for machining, to calculate a scattering trajectory of generated chips; and a position calculation unit that calculates an accumulation position of the chips based on the scattering trajectory of the chips calculated by the FEM analysis unit and an in-machine shape that is an internal shape of the machine tool.

That is, the position estimation unit is provided with the FEM analysis unit in order to analyze the machining conditions of the workpiece, and the FEM analysis unit performs an FEM analysis based on the machining parameter included in the NC program, and calculates the scattering trajectory of chips generated by machining. Then, the position calculation unit provided in the position estimation unit calculates the accumulation position of the chips based on the scattering trajectory of the chips and a preset in-machine shape.

As another aspect, it is preferable that the position estimation unit includes a machine learning device from which an accumulation position of the chips is output when a machining parameter included in an NC program used for machining and an in-machine shape that is an internal shape of the machine tool are input to the machine learning device.

That is, when the machining parameter and the in-machine shape are input to the machine learning device, the accumulation position of chips that corresponds to the machining parameter and the in-machine shape is output.

Specifically, it is preferable that the machine learning device is a primary learned device that has been subjected to primary learning in advance, using, as input data, the machining parameter and the in-machine shape, and using, as training data, the accumulation position of the chips calculated based on the scattering trajectory of the chips obtained by the FEM analysis based on the machining parameter and the in-machine shape. This configuration is excellent in that it is possible to promptly perform primary learning without requiring training data based on prior verification of the accumulation position using an actual tool machine.

It is more preferable that the machine learning device is a secondary learned device obtained by subjecting the primary learned device to secondary learning, using, as training data, an accumulation position of the chips obtained from captured images of an interior of the machine tool before and after machining. A machine learning device with a higher precision can be realized through accumulation of learning using the training data based on verification of the accumulation position using an actual machine tool.

It is preferable that the chip processing device further includes a machining control unit that moves a tool and a workpiece relative to each other, wherein the chip processing device is configured such that, in parallel with execution of the NC program by the machining control unit, estimation processing for the accumulation position by the position estimation unit is executed, and the nozzle orientation adjustment unit adjusts the orientation of the cleaning nozzle toward the accumulation position.

In this manner, when the machining processing and and the cleaning process using the cleaning nozzle are executed in parallel in the order of execution of the NC program, which is a collection of unit machining processes, it is possible not only to efficiently use the storage unit, but also to reduce the wait time, caused by prior estimation processing for the accumulation positions, before start of machining, as compared with a case where a large amount of operation data required for estimating processing for the accumulation positions of chips corresponding to all of the unit machining processes included in the NC program, and for adjustment of the orientation of the cleaning nozzle based on the estimated results is stored in the storage unit before execution of the NC program.

[Basic Embodiment of Chip Processing Method for Machine Tool]

A chip processing method for a machine tool according to the present invention is a chip processing method for a machine tool, including a cleaning nozzle control step of controlling a cleaning nozzle for spraying a cleaning fluid onto chips scattered during machining so as to guide the chips to a chip collection portion, wherein the cleaning nozzle control step includes: a position estimation step of estimating an accumulation position of generated chips by analyzing machining conditions of a workpiece, and a nozzle orientation adjustment step of adjusting an orientation of the cleaning nozzle toward the accumulation position estimated in the position estimation step.

The position estimation step includes: an FEM analysis step of performing an FEM analysis based on a machining parameter included in an NC program used for machining, to calculate a scattering trajectory of generated chips; and a position calculation step of calculating an accumulation position of the chips based on the scattering trajectory of the chips calculated in the FEM analysis step and an in-machine shape that is an internal shape of the machine tool.

The position estimation step is a step of inputting, to a machine learning device, a machining parameter included in an NC program used for machining and an in-machine shape that is an internal shape of the machine tool, and causing the machine learning device to output an accumulation position of the chips.

It is preferable that the machine learning device is a primary learned device that has been subjected to primary learning in advance, using, as an input data, the scattering trajectory of the chips obtained by the FEM analysis based on the machining parameter included in the NC program and the in-machine shape, and using, as training data, the accumulation position of the chips calculated based on the scattering trajectory and the in-machine shape.

Furthermore, it is preferable that the machine learning device is a secondary learned device obtained by subjecting the primary learned device to secondary learning, using, as training data, an accumulation position of the chips obtained from captured images of an interior of the machine tool before and after machining.

[Detailed Embodiment of Chip Processing Device for Machine Tool]

FIGS. 1(a) and (b) show a machining system 300 including a machine tool 100 in which a chip processing device according to the present invention is incorporated, and a control system 200 that controls the machine tool 100 based on a preset NC program.

The machine tool 100 is a vertical machining center including a bed 1, a saddle 2 that moves along a guide surface on the bed 1 in a Y-axis direction, a table 3 that moves along a guide surface on the saddle 2 in an X-axis direction, a column 4 provided vertically on the bed 1, and a spindle head 5 that moves along a guide surface on the column 4 in a Z-axis direction. Although not shown, a cover including a door member capable of opening and closing covers around the machine tool 100, and a control board constituting the control system 200 is provided on the outside of the cover.

The saddle 2 moves on the bed 1 along a linear drive shaft extending in the Y-axis direction when a servomotor MY is driven, the table 3 moves on the saddle 2 along a linear drive shaft extending in the X-axis direction when a servomotor MX is driven, and the spindle head 5 moves on the column 4 along a linear drive shaft extending in the Z-axis direction when a servomotor MZ is driven.

A tool 7 is held by a tool holder 6 provided on the spindle head 5, and the tool 7 rotates about a vertical axis when a servomotor MS1 is driven. The table 3 is formed in a "C" shape in front view, with a pair of vertical walls 3W disposed so as to be opposed to each other. A work holder 3H that holds a work 10, which is a workpiece, is provided on each of the vertical walls 3W, and the work 10 held by the work holder 3H rotates about a horizontal axis extending along the X axis when a servomotor MS2 is driven. That is, the table 3 serves as a work holding portion. For example, when side machining, groove machining, or the like of the work 10 is intended, an end mill having cutting edges on an outer circumferential surface and an end face thereof is used as the tool 7. As a result of the above-described servomotors being driven via a servo control unit based on the preset NC program, the work 10 and the tool 7 move relative to each other, and the work 10 is machined into a desired shape.

A coolant tank 8 in which a coolant, which is a fluid supplied for cooling or cleaning is collected is installed below the saddle 2, and the coolant tank 8 is configured such that chips generated due to machining are collected, together with the coolant, in the coolant tank 8. A chip conveyor 9 is disposed at a bottom portion of the coolant tank 8, and the chips collected in the coolant tank 8 are transported to the outside of the machine tool by the chip conveyor 9, and are collected in a collection container.

The machine tool 100 is provided with a chip processing device 50 that sprays the coolant serving as a cleaning fluid toward an accumulation position of chips 11, and guides the chips 11 to the coolant tank 8 together with the coolant such that the chips 11 generated when the work 10 is machined with the tool 7 and scattering in the machine tool will not be accumulated on the work 10, the table 3, the saddle 2, and so forth. This is because chips heated to a high temperature by the heat generated during cutting may cause thermal displacement in the work 10, the table 3, the saddle 2, and so forth, so that the machining precision may be reduced, and also because it is very difficult to clean and remove a large amount of accumulated chips at a later time.

Figure 2:
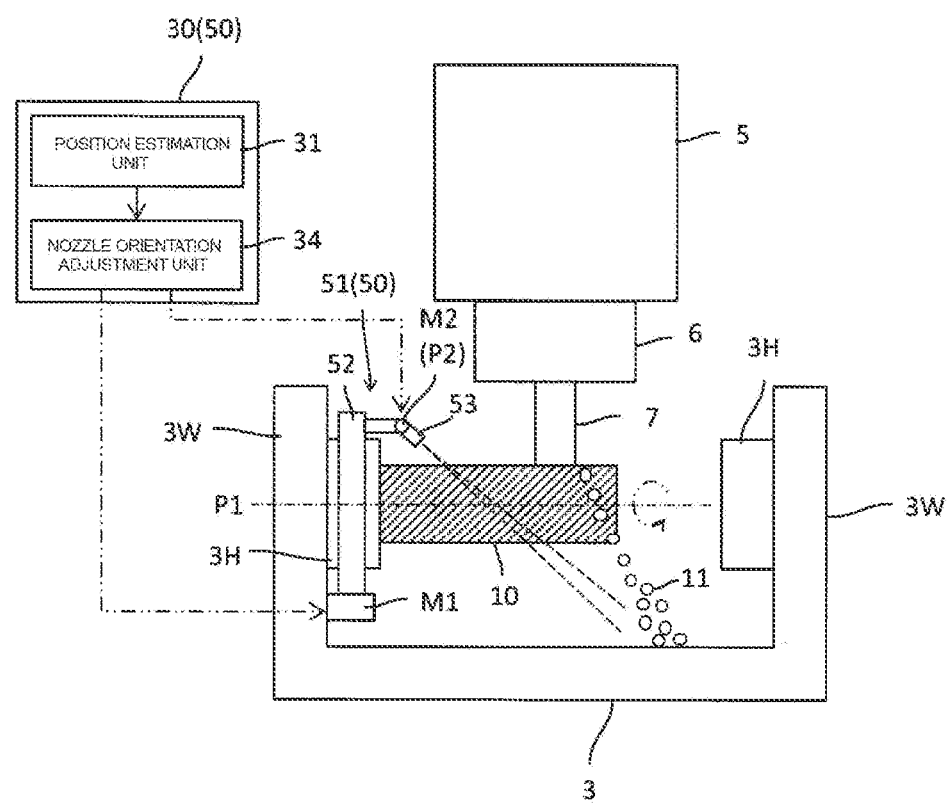
FIG. 2 is an explanatory diagram of relevant portions of the chip processing device.

As shown in FIG. 2, the chip processing device 50 includes a cleaning nozzle mechanism 51, and a cleaning nozzle control unit 30 that controls the cleaning nozzle mechanism 51.

The cleaning nozzle mechanism 51 includes an annular member 52 rotatably attached to the outer circumference of one of the work holders 3H via a bearing, and a cleaning nozzle 53 attached to the annular member 52. The cleaning nozzle 53 is attached to a side surface of the annular member 52 so as to protrude toward the other vertical wall 3W, and is configured such that a tip of the cleaning nozzle 53 can be swung about an axis P2 extending orthogonal to a rotation axis P1 of the work 10 by a motor M2 provided in the cleaning nozzle 53.

The annular member 52 is configured to be rotatable coaxially with the rotation axis P1 of the work 10 via a motor M1 attached to the vertical wall 3W and a gear mechanism for drive transmission. The rotation angle of the annular member 52 is adjusted by the motor M1, and the inclination angle of the cleaning nozzle 53 is adjusted by the motor M2, whereby the coolant can be sprayed in any given direction from the cleaning nozzle 53. Note that a fluid flow path that guides the coolant to the cleaning nozzle 53 is formed in the annular member 52, and, for example, the coolant collected in the coolant tank 8 is circulated through and supplied to the fluid flow path via a dust filter and a fluid transport pipe.

The cleaning nozzle control unit 30 includes a position estimation unit 31 that estimates an accumulation position of chips generated by machining, and a nozzle orientation adjustment unit 34 that controls the rotation of the motors M1 and M2 so as to adjust the orientation of the cleaning nozzle 53 toward the accumulation position estimated by the position estimation unit 31. The motors M1 and M2 are provided with encoders that detect the rotation positions of the respective drive shafts, and the nozzle orientation adjustment unit 34 performs control based on outputs of the encoders such that the rotation position of the annular member 52 and the inclination angle of the cleaning nozzle 53 become the target rotation position and the target inclination angle.

Figure 3:
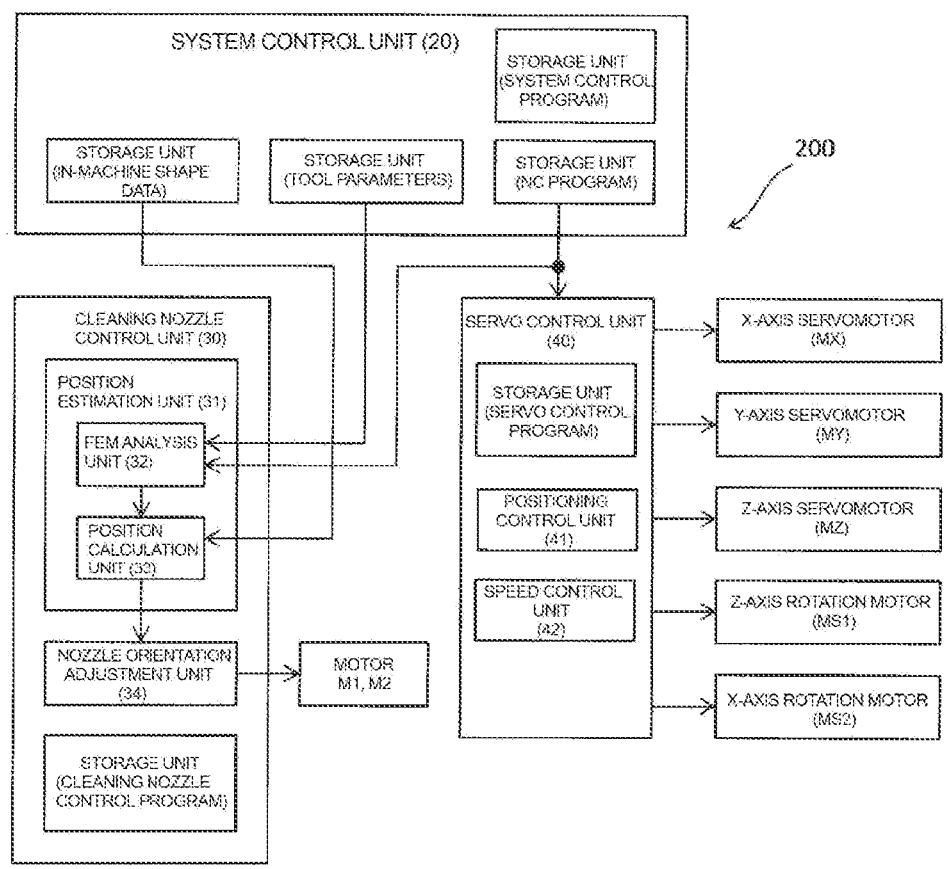
FIG. 3 is an explanatory diagram of functional blocks constituting a control system of the machine tool.

As shown in FIG. 3, the control system 200 includes a system control unit 20, a servo control unit 40, which is an example of a machining control unit that controls the above-described servomotors, and a cleaning nozzle control unit 30 that controls the cleaning nozzle mechanism 51 described above. The control units 20, 30, and 40 each include hardware such as a motherboard including a CPU, a ROM, and a RAM, and an I/O board that exchanges various types of control data between the motherboard and the machine tool 100 or an operator, and a communication board that exchanges necessary information between the motherboards.

Various programs and various types of data such as a system control program, an NC program, a tool parameter, and in-machine shape data are stored in the ROM of the system control unit 20, a servo control program that controls the various servomotors is stored in the ROM of the servo control unit 40, and a cleaning nozzle control program is stored in the ROM of the cleaning nozzle control unit 30.

In the servo control unit 40, the functional blocks of the positioning control unit 41 and the speed control unit 42 are implemented by the CPU executing the servo control program. In the cleaning nozzle control unit 30, the functional blocks of the position estimation unit 31 and the nozzle orientation adjustment unit 34 are implemented by the CPU executing the cleaning nozzle control program.

Furthermore, in the position estimation unit 31, the functional blocks of an FEM analysis unit 32 and a position calculation unit 33 are implemented, wherein the FEM analysis unit 32 performs an FEM analysis based on a machining parameter included in an NC program used for machining, and calculates the scattering trajectory of generated chips, and the position calculation unit 33 calculates the accumulation position of chips in the machine tool based on the scattering trajectory of the chips calculated by the FEM analysis unit 32 and the in-machine shape.

When a starting switch provided on an operation panel is operated by the operator, the system control unit 20 reads out the NC program, and sends a necessary control command to the servo control unit 40. Upon receiving the control command from the system control unit 20, the servo control unit 40 controls the servomotors via the positioning control unit 41 and the speed control unit 42 such that the tool and the work move to predetermined relative positions at a predetermined speed. The configuration of the control command is not particularly limited, and the control command may be in the form of, for example, a pulse train signal capable of specifying the feed amount, the feed speed, and the like necessary for servo control. The control command includes the above-described positions of the tool and the work, and the number of revolutions of the spindle, the feed speed, and so forth.

In parallel with execution of the NC program by the servo control unit 40, the system control unit 20 sends the machining conditions, the tool parameter, and the in-machine shape based on the NC program to the position estimation unit 31 provided in the data cleaning nozzle control unit 30. The FEM analysis unit 32 provided in the position estimation unit 31 calculates the scattering trajectory of chips generated by machining by performing an FEM analysis on the machining state of the work 10 based on the machining conditions of the work 10 and the tool parameter that are included in the NC program, and the position calculation unit 33 calculates the accumulation position of the chips based on the scattering trajectory of the chips calculated by the FEM analysis unit 32 and the in-machine shape.

Then, the nozzle orientation adjustment unit 34 adjusts the orientation of the cleaning nozzle 53 by controlling the motors M1 and M2 such that the coolant is sprayed to the accumulation position of the chips calculated by the position calculation unit 33.

That is, the chip processing device for a machine tool includes the servo control unit 40 configured to machine the work into a desired shape by relatively moving the spindle head 5 on which the tool 7 is held via the tool holder 6, and the work holding portion (table 3) on which the work 10 is held via the work holder 3H based on the NC program. The chip processing device is configured such that, in parallel with execution of the NC program by the servo control unit 40, estimation processing for the accumulation position by the position estimation unit 31 is executed, and the nozzle orientation adjustment unit 34 adjusts the orientation of the cleaning nozzle 53 toward the accumulation position.

[Detailed Embodiment of Chip Processing Method for Machine Tool]

Figure 4:
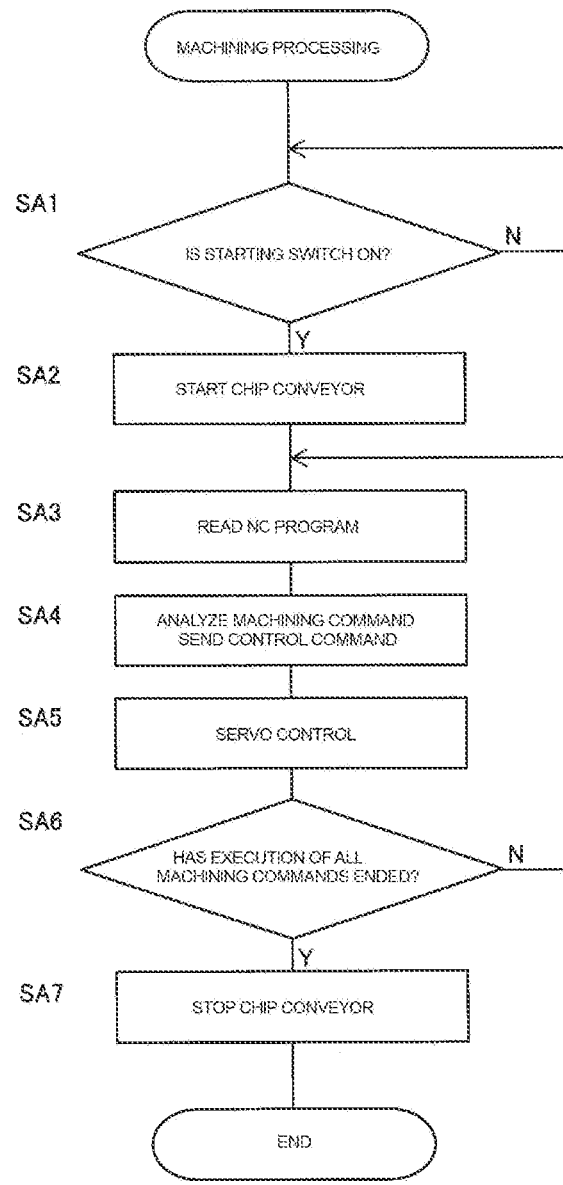
FIG. 4 is a flowchart illustrating a procedure of machining processing executed by the machine tool.

FIG. 4 shows a procedure of machining processing executed by the system control unit 20 and the servo control unit 40.

When the starting switch is operated (SA1), the system control unit 20 starts the chip conveyor 9 (SA2), reads the NC program stored in a storage unit (SA3), analyzes a machining command incorporated in the NC program, and sends a control command to the servo control unit 40 (SA4).

The servo control unit 40 that has received the control command controls the feed speed and the feed amount of the associated servomotors so as to perform control such that the tool 7 and the work 10 are located at predetermined relative positions, drives the spindle with the tool 7 attached thereto at a predetermined rotational speed via the Z-axis rotation motor MS1, and drives the work 10 at a predetermined rotational speed via the X-axis rotation motor MS2 (SA5).

As a result of the processing from step SA3 to step SA5 being repeatedly executed until execution of all of the commands included in the NC program ends, the work 10 is machined into a desired shape (SA6, N). When execution of all of the commands ends (SA6, Y), the chip conveyor 9 is stopped, and the machining ends.

Figure 5:
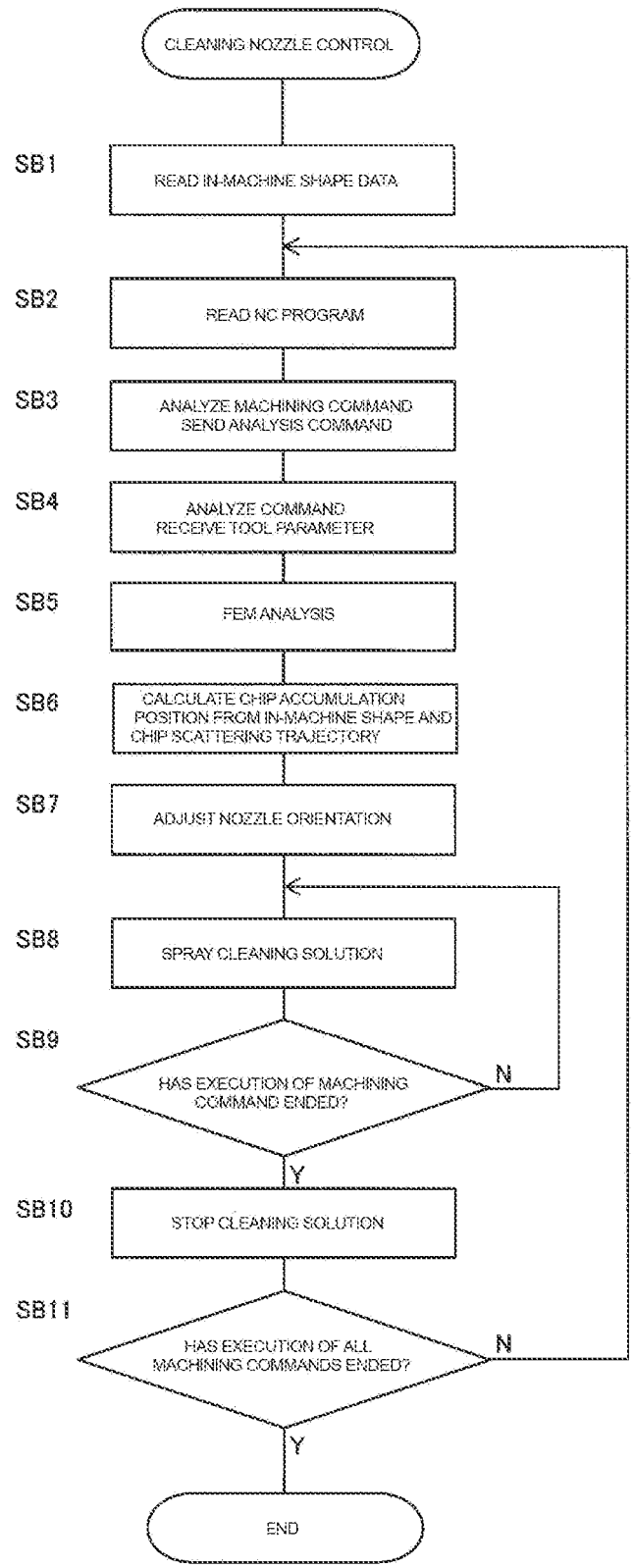
FIG. 5 is a flowchart illustrating a procedure of chip processing executed by the chip processing device incorporated in the machine tool.

FIG. 5 shows a procedure of cleaning nozzle control processing executed by the system control unit 20 and the cleaning nozzle control unit 30.

Initially, the in-machine shape data is sent from the system control unit 20 to the position calculation unit 33, and then stored in a storage unit provided in the cleaning nozzle control unit 30 (SB1).

Subsequently, the system control unit 20 reads the NC program stored in the storage unit (SB2), analyzes the machining command incorporated in the NC program, and sends an analysis command and a tool parameter to the FEM analysis unit 32 (SB3). Upon receiving the analysis command and the tool parameter (SB4), the FEM analysis unit 32 executes a predetermined FEM analysis program, and calculates the scattering trajectory of chips generated due to machining (SB5).

The position calculation unit 33 calculates the accumulation position of the chips based on the scattering trajectory of the chips calculated by the FEM analysis unit 32 and the in-machine shape data (SB6). The nozzle orientation adjustment unit 34 adjusts the orientation of the cleaning nozzle 53 by controlling the motors M1 and M2 (SB7) such that the coolant is sprayed to the accumulation position of the chips calculated by the position calculation unit 33, and opens a valve provided in the coolant supply path so as to spray the coolant from the cleaning nozzle 53 until execution of the machining command ends (SB8). When the machining command ends (SB9, Y), the nozzle orientation adjustment unit 34 closes the valve provided in the coolant supply path so as to stop the supply of the coolant (SB10).

As a result of the processing from step SB2 to step SB10 being repeatedly executed until execution of all of the commands included in the NC program ends (SB11, N), the chips generated during a period in which the work 10 is machined into a desired shape can be collected in the coolant tank 8 without being accumulated on the table 3 or the saddle 2. When execution of all of the commands ends (SB11, Y), the cleaning nozzle control processing ends.

That is, a position estimation step (SB5 and BB6) of estimating the accumulation position of the chips by analyzing the machining conditions of the work, which is a workpiece, and a nozzle orientation adjustment step (SB7) of adjusting the orientation of the cleaning nozzle toward the accumulation position estimated by the position estimation step constitute a cleaning nozzle control step.

An FEM analysis step (SB5) of performing an FEM analysis based on the machining parameter included in the NC program used for machining, to calculate the scattering trajectory of the chips, and a position calculation step (SB6) of calculating the accumulation position of the chips based on the scattering trajectory of the chips calculated by the FEM analysis step and the in-machine shape constitute a position estimation step.

[Details of FEM Analysis]

The FEM analysis unit 32 is an arithmetic processing unit that calculates generation and scattering directions of chips resulting from cutting or the like, using, for example, AvantEdge (registered trademark), which is software dedicated to chip generation simulation. The FEM analysis unit 32 is configured to receive, as inputs, an analysis command and a tool parameter, including, for example, the shapes and the material properties of the workpiece and the tool, and cutting conditions, analyze elastoplastic deformation and heat conduction by numerical arithmetic processing using a finite element method, and output a cutting resistance, a chip shape, a temperature, a stress distribution, a scattering direction, a scattering speed, and so forth. Note that the software for chip generation simulation is not limited to AvantEdge (registered trademark), and it is possible to use another software.

In the finite element method, a structure is divided into triangular elements each composed of three nodes, and analysis related to elastic deformation and plastic deformation is performed based on the fact that a relationship between an external force $\{f\}$ acting on each node and a displacement $\{V\}$ of the node is determined by a stiffness matrix $[K]$ from the formula $\{f\}=[K]\{V\}$. The external force $\{f\}$ and the stiffness matrix $[K]$ are set based on a machining parameter such as a tool parameter and an analysis command.

The tool parameter includes a tool material such as tool steel and cemented carbide, a tool type such as a drill, a milling cutter, and an end mill, and a tool characteristic such as a point angle in the case of a drill, the number of teeth and an entering angle in the case of a milling cutter, and the number of teeth, a bottom tooth shape and a helix angle in the case of an end mill, and includes a material characteristic of the workpiece (work), such as stainless steel and aluminum. The tool parameters are stored in advance in the storage unit provided in the system control unit 20, and a tool parameter necessary for analysis is extracted based on tool specific information or the like defined in the NC program, and the extracted tool parameter is provided to the FEM analysis unit 32.

The analysis command includes, for example, the machining route for the work, the number of revolutions of the tool, the feed speed per tooth, and the cutting depth, and these values are known from the NC program. Furthermore, if necessary, the drive power and the like of the motor that drives the spindle is supplied as a tool load from the servo control unit 40 to the FEM analysis unit 32 via the system control unit 20. That is, the machining parameter necessary for an FEM analysis is composed of any of the tool load, the tool parameter, and the analysis command, or a combination thereof.

If the arithmetic processing capability of the FEM analysis unit 32 is sufficiently secured at the time of executing estimation processing for the accumulation position by the position estimation unit 31 in parallel with execution of the NC program by the servo control unit 40, execution of the NC program by the servo control unit 40 and estimation processing for the accumulation position by the position estimation unit 31 can be synchronized.

However, if there is insufficiency in the arithmetic processing capability of the FEM analysis unit 32, it is possible to adopt a configuration in which a time difference is provided between execution of estimation processing for the accumulation position by the position estimation unit 31 and execution of the NC program by the servo control unit 40 such that estimation processing for the accumulation position by the position estimation unit 31 is performed ahead and the NC program by the servo control unit 40 is executed in parallel therewith.

That is, since the NC program is formed by a collection of a plurality of machining processes, by executing estimation processing for the accumulation position by the position estimation unit 31 ahead of execution timing of the NC program by the servo control unit 40 for each of the machining processes, the coolant can be sprayed in real time to the accumulation position of the chips at the execution timing of the NC program by the servo control unit 40.

Note that instead of performing execution of the NC program by the servo control unit 40 and estimation processing for the accumulation position by the position estimation unit 31 in parallel, it is possible to adopt a configuration in which the NC program is executed by the servo control unit 40 after all of the estimation processing for the accumulation position by the position estimation unit 31 has been completed.

[First Aspect of Position Estimation Processing]

The position calculation unit 33 may be configured to calculate the drop position and the drop amount of chips that change over time due to machining based on the scattering trajectory of chips calculated from the scattering direction and the scattering speed of chips obtained by the above-described numerical arithmetic processing and in-machine shape data indicating the three-dimensional shapes of the work 10, the saddle 2, the table 3, and so forth.

[Another Aspect of Position Estimation Processing]

In the above-described example, an aspect is described in which the position estimation unit 31 is composed of the FEM analysis unit 32 and the position calculation unit 33. However, it is possible to adopt a configuration in which the position estimation unit includes a machine learning device from which chip accumulation information including at least the accumulation position of chips is output when the above-described machining parameter and the in-machine shape are input to the machine learning device, without including the FEM analysis unit 32 and the position calculation unit 33. It is preferable that the chip accumulation information further includes an accumulation amount and an accumulation time.

Figure 6:
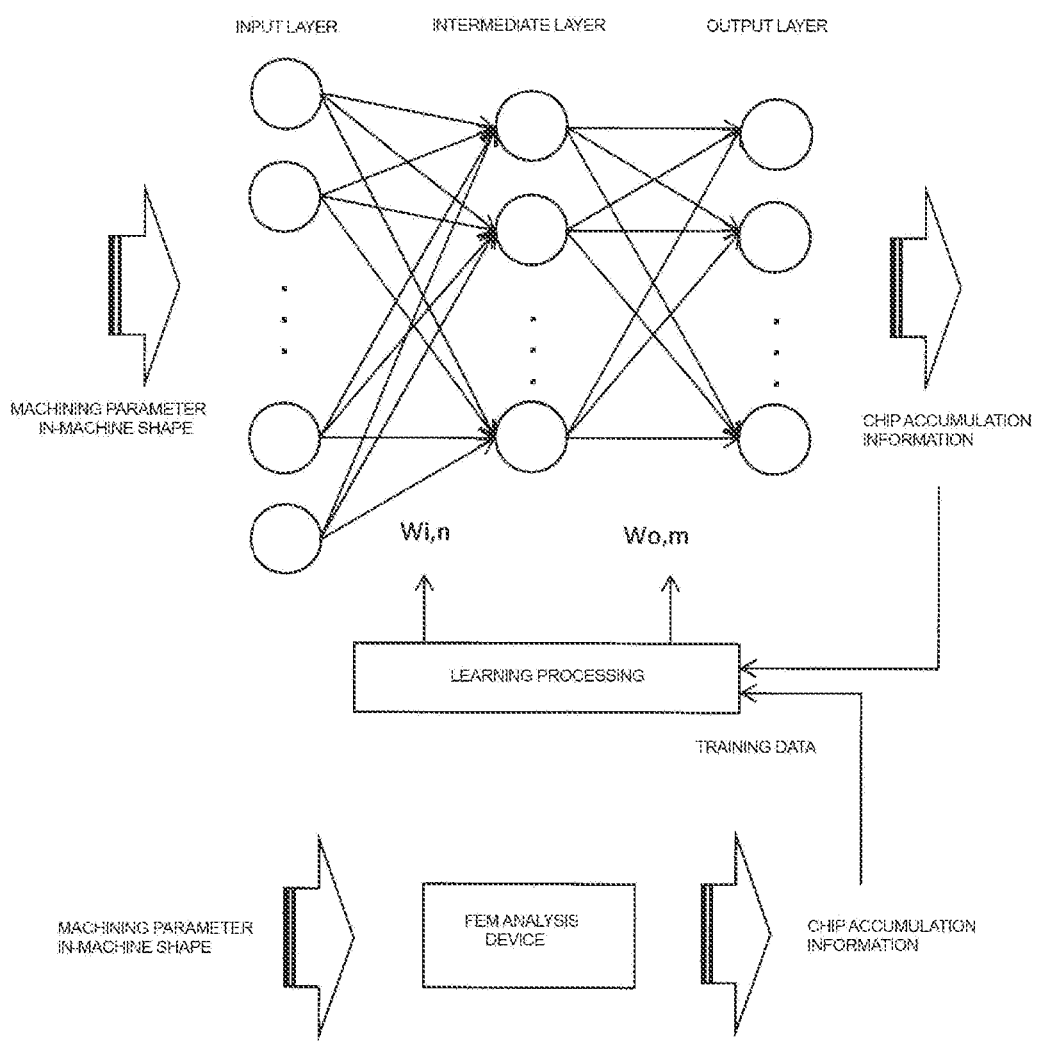
FIG. 6 is an explanatory diagram of a neural network, showing an example of a machine learning device.

FIG. 6 shows a neural network suitable as such a machine learning device.

The neural network is composed of three layers, namely, an input layer, an intermediate layer, and an output layer. Each of the nodes constituting the input layer and each of the nodes constituting the intermediate layer are coupled to each other with a predetermined coupling coefficient Wi, n (n is a product of the number of nodes of the input layer and the number of nodes of the intermediate layer), and each of the nodes constituting the intermediate layer and each of the nodes constituting the output layer are coupled to each other with a predetermined coupling coefficient Wo, m (m is a product of the number of nodes of the intermediate layer and the number of nodes of the output layer).

One segment, which serves as a unit of arithmetic processing, of the storage unit is associated with each of the nodes. For example, if the arithmetic processing is executed in units of 16 bits, the value of each of the nodes is represented by 16-bit data.

A value that is input to each of the nodes of the input layer is subjected to weighted addition based on the coupling coefficient Wi, n and an activation function, and the resulting value is input to each of the nodes of the intermediate layer. Furthermore, a value that is input to each of the nodes of the intermediate layer is subjected to weighted addition based on the coupling coefficient Wi, m, and an activation function, and the resulting value is input to each of the nodes constituting the output layer. That is, when the machining parameter and the in-machine shape are input to each of the nodes constituting the input layer, the accumulation position, the accumulation amount, and the accumulation time of chips in the machine tool are output from the output layer. A step function, a sigmoid function, or the like is used as the activation function.

The above-described machining parameter such as a tool material, a tool type, a tool characteristic, the material of the workpiece, the machining route, the number of revolutions of the tool, and the feed speed per tooth, and the in-machine shape are input.

For example, as for the tool material, the tool type, the tool characteristic, and the material of the workpiece, an option for each of these parameters is assigned to each of the nodes of the input layer, and 1 is input to the selected node, and zero is input to the non-selected nodes.

As for the quantitative characteristics such as the number of revolutions of the tool, the feed speed per tooth, and the cutting depth, a plurality of value ranges are assigned in advance to each of the nodes of the input layer, and 1 is input to the corresponding node, and zero is input to the non-corresponding nodes.

Furthermore, as for the in-machine shape, the interior of the machine tool is divided into a plurality of square regions in plan view. Each of the divided regions is assigned to a node, and the height of the square region resulting from normalization in the range of zero to 1 is input to the corresponding node.

The output layer includes a node indicating the accumulation amount of chips and a node indicating the accumulation time for each of the above-described square regions. An accumulation amount is output in the range of zero to 1 to the node indicating the accumulation amount of chips, and an elapsed time normalized by the time required from start to end of machining and indicated in the range of zero to 1 is output to the node indicating the accumulation time. If zero is output to the node indicating the accumulation amount, it can be determined that no chip will be accumulated in the square region specified by that node. If a value other than zero is output to that node, it can be determined that the closer the value is to 1, the larger the amount of accumulation of chips is.

Such a neural network has been subjected to learning in advance based on training data such that the coupling coefficients Wi, n and Wo, m take optimal values.

This will be specifically described. The accumulation amount and the accumulation time of chips for each square region that have been obtained in advance by performing an FEM analysis on the machining parameter and the in-machine shape for each standard unit machining process using an FEM analysis device are prepared as training data.

Thereafter, an operation of adjusting the coupling coefficients Wi, n and Wo, m is repeatedly performed such that a difference value between the data that is output from the output layer when the corresponding machining parameter and in-machine shape are input to the input layer for each standard unit machining process, and the above-described training data is minimum. As such a learning algorithm, an error propagation method is preferably used.

Figure 7:
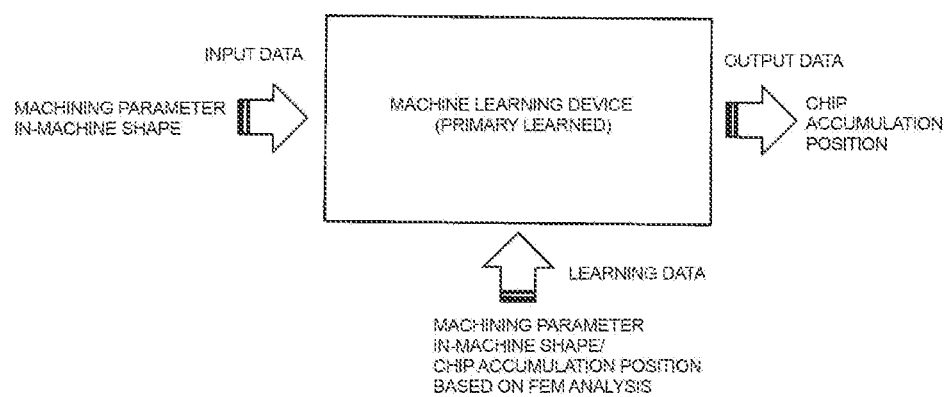
FIG. 7(a) is an explanatory diagram of a primary learned machine learning device provided in a position estimation unit.
FIG. 7(b) is an explanatory diagram of a secondary learned machine learning device provided in the position estimation unit.
Figure 7:
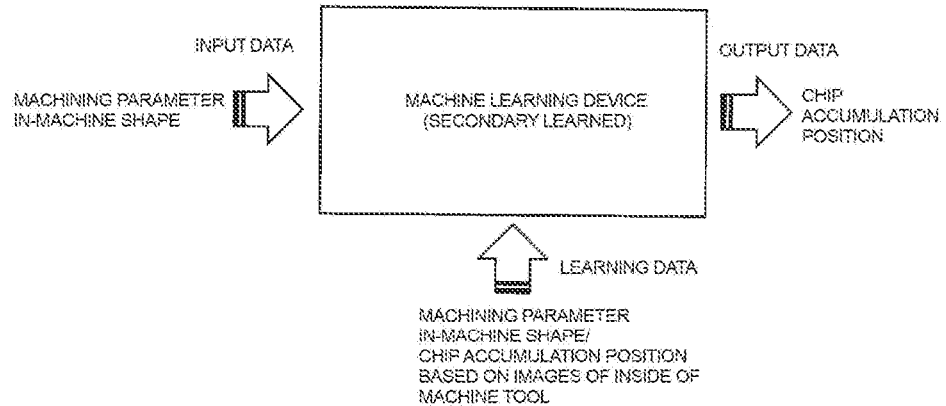

That is, as shown in FIG. 7(a), the machine learning device is constituted by a primary learned device that has been subjected to primary learning in advance, using, as input data, the machining parameter and the in-machine shape, and using, as training data, the accumulation position of the chips calculated based on the scattering trajectory of the chips obtained by the FEM analysis based on the machining parameter and the in-machine shape.

[Still Another Aspect of Position Estimation Processing]

In the description of the neural network shown in FIG. 6, a primary learned device that has been subjected to learning using, as the training data, an analysis result obtained using the FEM analysis device is used as the machine learning device. However, as shown in FIG. 7(b), it is more preferable that the machine learning device is constituted by a secondary learned device obtained by subjecting the primary learned device to secondary learning using, as training data, an accumulation position of the chips obtained from captured images of an interior of the machine tool before and after machining.

A captured image in plan view of the interior state of an actual machine tool, showing an accumulation state of chips generated when causing the machine tool to execute an NC program defining a unit machining process specified by a predetermined machining parameter, and a captured image of the interior of the machine tool before chips scatters are compared through image processing, and training data indicating how much chips are accumulated in which of a plurality of divided square regions in plan view of the interior of the machine tool is generated. By subjecting the primary learned device to secondary learning using the training data, the coupling coefficients Wi, n and Wo, m can be adjusted to more appropriate values.

Note that the above-described neural networks are illustrative examples, and the number of nodes constituting each of the input layer, the intermediate layer, and the output layer, the type and the format of the input data that is input to the input layer, and the type and the format of the output data that is output from the output layer are not limited to the examples, and can be set as appropriate.

Also, as the learning algorithm, it is possible to use an algorithm other than an error propagation method, and it is also possible to use a neural network that is deepened with an increased number of intermediate layers so as to be subjected to deep learning.

OTHER EMBODIMENTS

Although not particularly described in the above embodiment, another cleaning nozzle for supplying a coolant to a position where the tool and the work come into contact may be provided for the purpose of lubrication, cooling, chip removal, and the like, in addition to the cleaning nozzle for cleaning and removing chips scattered in the machine tool.

The fluid sprayed from the cleaning nozzle in order to remove the chips scattered in the machine tool is not limited to a coolant, and another fluid such as compressed gas can be used as the cleaning fluid.

In the above-described embodiment, an example is described in which the machine tool 100 is constituted by a vertical machining center. However, the machine tool 100 to which the present invention is applied is not limited to a vertical machining center, and the present invention can be applied to various machining centers, and also can be applied to a machine tool, such as a lathe, that does not include a spindle head that holds a tool.

Specific structure and attachment position of the cleaning nozzle mechanism 51 are also not limited to the above-described embodiment. The cleaning nozzle mechanism 51 may be attached to another member such as the spindle head, and the number of cleaning nozzle mechanisms 51 may be plural.

The embodiments and aspects of the present invention have been described above. However, the contents of the disclosure may change in the details of the configuration, and the combinations of the elements and the changes of the sequence in the embodiments and aspects can be achieved without departing from the scope and idea of the present invention.

INDUSTRIAL APPLICABILITY

As described above, the present invention makes it possible to realize a machine tool including a chip processing device that enables the orientation of a nozzle to be automatically adjusted such that a cleaning fluid is ejected toward an area where chips are accumulated, without relying on an operation performed by the operator.

REFERENCE SIGNS LIST

1 . . . Bed
2 . . . Saddle
3 . . . Table
3W . . . Vertical wall
3H . . . Work holder
4 . . . Column
5 . . . Spindle head
6 . . . Tool holder
7 . . . Tool
8 . . . Coolant tank
9 . . . Chip conveyor
10 . . . Workpiece (work)
11 . . . Chips
20 . . . System control unit
30 . . . Cleaning nozzle control unit
31 . . . Position estimation unit
32 . . . FEM analysis unit
33. Position calculation unit
34 . . . Nozzle orientation adjustment unit
40 . . . Servo control unit
41 . . . Positioning control unit
42 . . . Speed control unit
50 . . . Chip processing device
100 . . . Machine tool
200 . . . Control system
300 . . . Machining system

The invention claimed is:

1. A chip processing device for a machine tool, comprising
a cleaning nozzle control unit that controls a cleaning nozzle for spraying a cleaning fluid onto chips scattered during machining so as to guide the chips to a chip collection portion,
wherein the cleaning nozzle control unit includes:
a position estimation unit that estimates an accumulation position of chips to be generated, before the chips are generated, by analyzing machining conditions of a workpiece that are conditions for machining the workpiece with a tool; and
a nozzle orientation adjustment unit that adjusts an orientation of the cleaning nozzle toward the accumulation position estimated by the position estimation unit;
wherein the position estimation unit includes a machine learning device from which an accumulation position of the chips is output when a machining parameter included in an NC program used for machining and an in-machine shape that is an internal shape of the machine tool are input to the machine learning device;
wherein the machine learning device comprises a primary learned device that has been subjected to primary learning in advance, using, as input data, the machining parameter and the in-machine shape, and using, as training data, the accumulation position of the chips calculated based on the scattering trajectory of the chips obtained by the FEM analysis based on the machining parameter and the in-machine shape;
wherein the machine learning device comprises a secondary learned device obtained by subjecting the primary learned device to secondary learning, using, as training data, an accumulation position of the chips obtained from captured images of an interior of the machine tool before and after machining.

2. The chip processing device for a machine tool according to claim 1,
wherein the position estimation unit includes:
an FEM analysis unit that performs an FEM analysis based on a machining parameter included in an NC program used for machining, to calculate a scattering trajectory of chips to be generated; and
a position calculation unit that calculates an accumulation position of the chips based on the scattering trajectory of the chips calculated by the FEM analysis unit and an in-machine shape that is an internal shape of the machine tool.

3. The chip processing device for a machine tool according to claim 2, further comprising
a machining control unit that moves a tool and a workpiece relative to each other, wherein the chip processing device is configured such that, in parallel with execution of the NC program by the machining control unit, estimation processing for the accumulation position by the position estimation unit is executed, and the nozzle orientation adjustment unit adjusts the orientation of the cleaning nozzle toward the accumulation position.

4. The chip processing device for a machine tool according to claim 2,
wherein the position estimation unit includes a machine learning device from which an accumulation position of the chips is output when a machining parameter included in an NC program used for machining and an in-machine shape that is an internal shape of the machine tool are input to the machine learning device.

5. The chip processing device for a machine tool according to claim 1, further comprising
a machining control unit that moves a tool and a workpiece relative to each other, wherein the chip processing device is configured such that, in parallel with execution of the NC program by the machining control unit, estimation processing for the accumulation position by the position estimation unit is executed, and the nozzle orientation adjustment unit adjusts the orientation of the cleaning nozzle toward the accumulation position.

6. The chip processing device for a machine tool according to claim 1, further comprising
a machining control unit that moves a tool and a workpiece relative to each other, wherein the chip processing device is configured such that, in parallel with execution of the NC program by the machining control unit, estimation processing for the accumulation position by the position estimation unit is executed, and the nozzle orientation adjustment unit adjusts the orientation of the cleaning nozzle toward the accumulation position.

7. The chip processing device for a machine tool according to claim 1, further comprising
a machining control unit that moves a tool and a workpiece relative to each other, wherein the chip processing device is configured such that, in parallel with execution of the NC program by the machining control unit, estimation processing for the accumulation position by the position estimation unit is executed, and the nozzle orientation adjustment unit adjusts the orientation of the cleaning nozzle toward the accumulation position.

8. A chip processing method for a machine tool, comprising
a cleaning nozzle control step of controlling a cleaning nozzle for spraying a cleaning fluid onto chips scattered during machining so as to guide the chips to a chip collection portion,
wherein the cleaning nozzle control step includes:
a position estimation step of estimating an accumulation position of chips to be generated, before the chips are generated, by analyzing machining conditions of a workpiece that are conditions for machining the workpiece with a tool, and
a nozzle orientation adjustment step of adjusting an orientation of the cleaning nozzle toward the accumulation position estimated in the position estimation step;
wherein the position estimation step is a step of inputting, to a machine learning device, a machining parameter included in an NC program used for machining and an in-machine shape that is an internal shape of the machine tool, and causing the machine learning device to output an accumulation position of the chips;
wherein the machine learning device comprises a primary learned device that has been subjected to primary learning in advance, using, as input data, the machining parameter and the in-machine shape, and using, as training data, the accumulation position of the chips calculated based on the scattering trajectory of the chips obtained by the FEM analysis based on the machining parameter and the in-machine shape;
wherein the machine learning device comprises a secondary learned device obtained by subjecting the primary learned device to secondary learning, using, as training data, an accumulation position of the chips obtained from captured images of an interior of the machine tool before and after machining;
wherein the machine learning device is a secondary learned device obtained by subjecting the primary learned device to secondary learning, using, as training data, an accumulation position of the chips obtained from captured images of an interior of the machine tool before and after machining.

9. The chip processing method for a machine tool according to claim 8,
wherein the position estimation step includes:
an FEM analysis step of performing an FEM analysis based on a machining parameter included in an NC program used for machining, to calculate a scattering trajectory of chips to be generated chips; and
a position calculation step of calculating an accumulation position of the chips based on the scattering trajectory of the chips calculated in the FEM analysis step and an in-machine shape that is an internal shape of the machine tool.

* * * * *